United States Patent [19]
Chatterji et al.

[11] Patent Number: 5,957,204
[45] Date of Patent: *Sep. 28, 1999

[54] METHOD OF SEALING CONDUITS IN LATERAL WELL BORES

[75] Inventors: Jiten Chatterji; David D. Onan, both of Duncan; Roger S. Cromwell, Walters; Bobby J. King, Duncan, all of Okla.

[73] Assignee: Halliburton Energy Services, Inc., Duncan, Okla.

[*] Notice: This patent is subject to a terminal disclaimer.

[21] Appl. No.: 08/979,047

[22] Filed: Nov. 26, 1997

Related U.S. Application Data

[63] Continuation-in-part of application No. 08/914,594, Aug. 18, 1997, Pat. No. 5,873,413.

[51] Int. Cl.⁶ ..................................................... E21B 33/13
[52] U.S. Cl. ........................... 166/295; 166/50; 405/128; 405/264
[58] Field of Search ............................. 166/50, 281, 292, 166/294, 295, 285; 405/128, 264

[56] References Cited

U.S. PATENT DOCUMENTS

| | | | |
|---|---|---|---|
| 2,815,079 | 12/1957 | Goins, Jr. et al. | 166/29 |
| 3,082,823 | 3/1963 | Hower | 166/29 |
| 3,208,525 | 9/1965 | Caldwell et al. | 166/33 |
| 3,310,111 | 3/1967 | Pavlich et al. | 166/33 |
| 3,416,604 | 12/1968 | Rensvold | 166/33 |
| 3,467,208 | 9/1969 | Kelly | 175/72 |
| 3,750,768 | 8/1973 | Suman, Jr. et al. | 175/72 |
| 3,782,466 | 1/1974 | Lawson et al. | 166/254 |
| 3,933,204 | 1/1976 | Knapp | 166/295 |
| 3,960,801 | 6/1976 | Cole et al. | 260/33.6 EP |
| 3,976,135 | 8/1976 | Anderson | 166/276 |
| 4,042,031 | 8/1977 | Knapp | 166/276 |
| 4,072,194 | 2/1978 | Cole et al. | 166/295 |
| 4,101,474 | 7/1978 | Copeland et al. | 260/13 |
| 4,113,015 | 9/1978 | Meijs | 166/295 |
| 4,215,001 | 7/1980 | Elphingstone et al. | 252/8.55 C |
| 4,220,566 | 9/1980 | Constien | 260/13 |
| 4,272,384 | 6/1981 | Martin | 252/8.55 R |
| 4,336,842 | 6/1982 | Graham et al. | 166/276 |
| 4,483,888 | 11/1984 | Wu | 427/336 |
| 4,489,785 | 12/1984 | Cole | 166/295 |
| 4,665,988 | 5/1987 | Murphey et al. | 166/295 |
| 4,741,401 | 5/1988 | Walles | 166/300 |
| 4,785,884 | 11/1988 | Armbruster | 166/280 |
| 4,921,047 | 5/1990 | Summers | 166/276 |
| 4,972,906 | 11/1990 | McDaniel | 166/276 |
| 5,133,409 | 7/1992 | Bour et al. | 166/293 |
| 5,159,980 | 11/1992 | Onan et al. | 166/294 |
| 5,168,928 | 12/1992 | Terry et al. | 166/292 |
| 5,213,161 | 5/1993 | King et al. | 166/293 |
| 5,293,938 | 3/1994 | Onan et al. | 166/293 |
| 5,314,023 | 5/1994 | Dartez | 166/295 |
| 5,325,723 | 7/1994 | Meadows et al. | 73/794 |
| 5,335,726 | 8/1994 | Rodrigues | 166/295 |
| 5,337,824 | 8/1994 | Cowan | 166/293 |
| 5,358,044 | 10/1994 | Hale et al. | 166/293 |
| 5,358,051 | 10/1994 | Rodrigues | 166/295 |
| 5,361,841 | 11/1994 | Hale et al. | 166/293 |
| 5,361,842 | 11/1994 | Hale et al. | 166/293 |
| 5,368,102 | 11/1994 | Dewprashad et al. | 166/276 |
| 5,373,901 | 12/1994 | Norman et al. | 166/300 |
| 5,377,757 | 1/1995 | Ng | 166/277 |
| 5,428,178 | 6/1995 | Zuzich et al. | 549/378 |
| 5,458,195 | 10/1995 | Totten et al. | 166/293 |
| 5,547,027 | 8/1996 | Chan et al. | 166/295 |
| 5,559,086 | 9/1996 | Dewprashad et al. | 207/219 |
| 5,875,844 | 3/1999 | Chatterji et al. | 166/295 X |
| 5,875,845 | 3/1999 | Chatterji et al. | 166/295 X |

FOREIGN PATENT DOCUMENTS

| | | | |
|---|---|---|---|
| 0 553 566 A1 | 8/1993 | European Pat. Off. | C21B 43/04 |
| 0 802 253 A1 | 10/1997 | European Pat. Off. | C09K 7/02 |
| 1315462 | 12/1962 | France . | |
| 1019122 | 2/1966 | United Kingdom | E02D 3/14 |
| WO 91/02703 | 7/1991 | WIPO | C04B 24/24 |
| WO 94/12445 | 9/1994 | WIPO | C04B 26/18 |

*Primary Examiner*—Roger Schoeppel
*Attorney, Agent, or Firm*—Craig W. Roddy; C. Clark Dougherty, Jr.

[57] ABSTRACT

The present invention provides methods of sealing conduits in multi-lateral wells whereby the sealant can withstand stress induced conduit movements without failure. The methods basically include the steps of preparing a hardenable epoxy composition having flexibility and resiliency upon hardening including an epoxide containing liquid or an epoxy resin and an epoxide containing liquid and a hardening agent. The epoxy composition is placed into a lateral well bore between a conduit therein and the walls of the lateral well bore and allowed to harden therein.

20 Claims, No Drawings

METHOD OF SEALING CONDUITS IN LATERAL WELL BORES

RELATED U.S. APPLICATION DATA

This application is a continuation-in-part of application Ser. No. 08/914,594, filed on Aug. 18, 1997, now U.S. Pat. No. 5,873,413.

BACKGROUND OF THE INVENTION

1. Field of the Invention

The present invention relates generally to methods of sealing conduits in lateral well bores whereby the sealant can withstand stress induced conduit movements without failure.

2. Description of the Prior Art

Hydraulic cement compositions are commonly utilized in oil, gas and water well completion and remedial operations. For example, hydraulic cement compositions are used in primary cementing operations whereby a conduit such as a string of casing is cemented in a well bore. In performing primary cementing, a hydraulic cement composition is pumped into the annular space between the walls of the well bore and the exterior of a string of casing disposed therein. The cement composition is permitted to set in the annular space thereby forming an annular sheath of hardened substantially impermeable cement therein. The cement sheath physically supports and positions the casing in the well bore and bonds the casing to the walls of the well bore whereby the undesirable migration of fluids between zones or formations penetrated by the well bore is prevented.

The development of wells including one or more laterals to increase production has recently taken place. Such wells include vertical or deviated principal well bores having one or more laterally extending well bores connected thereto. Drilling and completion equipment has been developed which allows lateral well bores to be drilled from a principal well bore in which casing has previously been cemented. Each of the lateral well bores usually includes a conduit, known in the art as a liner, cemented therein which is tied into the conduit (casing) in the principal well bore.

While single lateral and multi-lateral wells have been successfully drilled and operated, a problem in the operation involves the cement utilized to bond and seal the conduits in the lateral well bores. Such conduits have been cemented in lateral well bores by introducing cement slurries into the annular clearances between the walls of the well bores and the conduits. The cement slurries set into hard masses to thereby support the conduits in the well bores and to seal the annuluses whereby fluid flow through the annuluses between formations and zones is prevented. Typically, the cement slurries which have been utilized set into brittle solid masses, and as a result, they cannot withstand the conduit movements caused by impacts and shocks subsequently generated by drilling and other well operations carried out in the laterals without cracking or shattering. Once the set cement is cracked or shattered, it allows leakage of fluid through at least portions of the well bores which is often highly detrimental.

Thus, there are needs for improved methods of sealing conduits in lateral well bores whereby the sealant can withstand stress induced conduit movements without failure.

SUMMARY OF THE INVENTION

The present invention provides improved methods of sealing a conduit in a lateral well bore which meets the needs described above and overcomes the deficiencies of the prior art. The methods basically comprise the steps of preparing a hardenable epoxy composition having high degrees of flexibility and resiliency upon hardening such as an epoxide containing liquid selected from the group of diglycidyl ethers of 1,4-butanediol, neopentyl glycol and cyclohexane dimethanol and a hardening agent selected from the group of aliphatic amines and carboxylic acid anhydrides, placing the epoxy composition into the lateral well bore between the conduit therein and the walls of the well bore and allowing the epoxy composition to harden in the well bore. Upon hardening, the resulting flexible and resilient epoxy sealant composition bonds and seals the conduit to the walls of the well bore and the sealant can withstand stress induced movements in the conduit without failure.

It is, therefore, a general object of the present invention to provide methods of sealing conduits in multi-lateral wells.

Other and further objects, features and advantages of the present invention will be readily apparent to those skilled in the art upon a reading of the description of preferred embodiments which follows.

DESCRIPTION OF THE PREFERRED EMBODIMENTS

By the present invention, improved methods of bonding and sealing a conduit in a lateral well bore are provided whereby the sealant utilized can withstand stress induced conduit movements caused by impacts, shocks and the like generated by drilling and other well operations subsequently carried out in the well bore. The methods basically comprise the steps of preparing a hardenable epoxy sealant composition which has a pumping time and viscosity such that it can be pumped into the lateral well bore between the conduit therein and the walls of the well bore. Because of its low viscosity, the sealant composition enters the porosity of the subterranean stratum forming the walls of the well bore whereby upon hardening it forms a strong bond between the conduit and the walls. Also, upon hardening, the sealant has high degrees of flexibility and resiliency whereby it can withstand stress induced conduit movements without failure. Once prepared, the epoxy sealant composition is pumped into the lateral well bore between the conduit and the walls of the well bore. Thereafter, the epoxy composition is allowed to harden whereby the conduit is bonded and sealed in the well bore.

In applications where an epoxy sealant composition having a very low viscosity is required in order for the composition to be able to enter the pores of the stratum forming the walls of a well bore, i.e., a viscosity in the range of from about 10 to about 100 centipoises, an epoxy sealant composition comprised of an epoxide containing liquid and a hardening agent is utilized. While various low viscosity epoxide containing liquids can be used, preferred such liquids are selected from the group of diglycidyl ethers of 1,4-butanediol, neopentyl glycol and cyclohexane dimethanol. A suitable epoxide containing liquid comprised of the diglycidyl ether of 1,4-butanediol is commercially available from the Shell Chemical Company of Houston, Tex. under the trade name "HELOXY®67". This epoxide containing liquid has a viscosity at 25° C. in the range of from about 13 to about 18 centipoises, a molecular weight of 202 and a one gram equivalent of epoxide per about 120 to about 130 grams of the liquid. A suitable diglycidyl ether of neopentyl glycol is commercially available from Shell Chemical Company under the trade designation "HELOXY®68". This epoxide containing liquid has a viscosity at 25° C. in the range of from about 13 to about 18 centipoises, a molecular weight of 216 and a one gram equivalent of epoxide per about 130 to about 140 grams of the liquid. A suitable diglycidyl ether of cyclohexane dimethanol is commercially available from Shell Chemical Company under the trade designation "HELOXY®107". This epoxide containing liquid has a viscosity at 25° C. in the range of from about 55 to about 75 centipoises, a molecular weight of 256 and a one gram equivalent of epoxide per about 155 to about 165 grams of the liquid.

A variety of hardening agents, including, but not limited to, aliphatic amines, aliphatic tertiary amines, aromatic amines, cycloaliphatic and heterocyclic amines, amido amines, polyamides, polyethyl amines and carboxylic acid anhydrides can be utilized with the above described epoxide containing liquids. Examples of suitable aliphatic amines are triethylenetetramine, ethylenediamine, N-cocoalkyltrimethylenediamine, isophoronediamine, N-aminoethylpiperazines, imidazoline, and 1,2-diaminecyclohexane. Examples of suitable carboxylic acid anhydrides are methyltetrahydro-phthalic anhydride, hexahydrophthalic anhydride, maleic anhydride, polyazelaic polyanhydride and phthalic anhydride. Of these, triethylenetetramine, ethylenediamine, N-cocoalkyltrimethylenediamine, isophoronediamine and diethyltoluenediamine are preferred, with isophoronediamine and diethyltoluenediamine being the most preferred. The hardening agent utilized is generally included in the epoxy sealant composition in an amount in the range of from about 15% to about 31% by weight of the epoxide containing liquid in the composition, most preferably about 25%.

In multilateral junction sealing applications, fillers such as crystalline silicas, amorphous silicas, clays, calcium carbonate or barite can be included in the epoxy sealant composition. When such a filler is utilized, it is generally present in the composition in an amount in the range of from about 100% to about 150% by weight of the composition.

In applications where a higher viscosity epoxy resin sealing composition can be used, i.e., a viscosity in the range of from about 90 to about 120 centipoises, an epoxy resin composition comprised of an epoxy resin, an epoxide containing liquid and a hardening agent is utilized. While various epoxy resins can be used, preferred such resins are those selected from the condensation products of epichlorohydrin and bisphenol A. A particularly suitable such resin is commercially available from the Shell Chemical Company under the trade designation "EPON® RESIN 828". This epoxy resin has a molecular weight of 340 and a one gram equivalent of epoxide per about 180 to about 195 grams of resin.

An epoxide containing liquid, preferably of one of the types described above, i.e., an epoxide containing liquid selected from the group of diglycidyl ethers of 1,4-butanediol, neopentyl glycol and cyclohexane dimethanol, is utilized to modify the viscosity of the epoxy resin used and add flexibility and resiliency to the resulting composition after hardening. The epoxide containing liquid is included in the epoxy resin composition in an amount in the range of from about 15% to about 40% by weight of the epoxy resin in the composition, most preferably in an amount of about 25%.

The hardening agent is preferably selected from the group of aliphatic amines and acid anhydrides set forth above, with triethylenetetramine, ethylenediamine, N-cocoalkyltrimethylenediamine, isophoronediamine and diethyltoluenediamine being preferred. The most preferred hardening agents are isophoronediamine and diethyltoluenediamine. The hardening agent is included in the epoxy resin composition in an amount in the range of from about 5% to about 45% by weight of the composition, preferably in an amount of about 30%.

As mentioned above in connection with the low viscosity epoxy composition, the higher viscosity epoxy resin composition can include a filler such as crystalline silicas, amorphous silicas, clays, calcium carbonate or barite. When used, the filler is present in the composition in an amount in the range of from about 100% to about 150% by weight of the composition.

The above described epoxy resin composition can be dispersed in an aqueous carrier liquid to enhance the ability of the composition to enter the porosity of water wet strata. To facilitate preparing the aqueous dispersion, a water borne epoxy resin which is commercially available from the Shell Chemical Company under the trade designation "EPI-REZ®" can be utilized. The epoxide containing liquid and hardening agent used with the epoxy resin can be dispersed or dissolved in the water borne epoxy resin to form an aqueous dispersion of the epoxy resin composition.

In order to further illustrate the methods and compositions of this invention, the following example is given.

EXAMPLE 1

A number of epoxy sealant compositions useful in accordance with this invention were prepared containing the components and in the amounts shown in the Table below. The compositions were tested for thickening times, compressive strengths, shear bond strengths and tensile strengths in accordance with the procedures set forth in *API Specification For Materials And Testing For Well Cements*, API Specification 10, 5th Edition, dated Jul. 1, 1990 of the American Petroleum Institute. The results of these tests are set forth in the Table below:

TABLE

EPOXY SEALANT COMPOSITION PROPERTIES

| Sealant Composition Components | | | | | | Thickening Time To 100 Bc, hr:min | | | Compressive Strength, psi | | | Shear Bond Strength[5], psi | | | Tensile Strength[6], psi | | |
|---|---|---|---|---|---|---|---|---|---|---|---|---|---|---|---|---|---|
| Epoxy Containing Liquid | Quantity, Grams | Hardening Agent | Quantity, Grams | Filler | Quantity, Grams | 100° F. | 150° F. | 200° F. | 100° F. | 150° F. | 190° F. | 140° F. | 240° F. | 280° F. | 140° F. | 240° F. | 280° F. |
| Diglycidal Ether of 1,4-Butendiol[1] | 400 | Diethyl-toluene-diamine[2] | 132 | Micro-sand | 600 | — | 10:45 | 3:45 | — | 10,300 (72 hrs) | 7,800 (24 hrs) | — | — | 103 | — | — | 176 |
| Diglycidal Ether of 1,4-Butandiol[1] | 400 | Diethyl-toluene-diamine[2,3] | 132 | Micro-sand | 600 | — | 4:00 | — | — | 3,610 (24 hrs) | — | — | 101 | — | — | 246 | — |
| Diglycidal Ether of 1,4-Butandiol[1] | 400 | Isophrone-diamine[4] | 130 | Micro-sand | 600 | 2:15 | — | — | 6,033 (24 hrs) | — | — | 255 | — | — | 1832 | — | — |

[1]"HELOXY ® 67" from Shell Chemical Co.
[2]"EPI-CURE ® (R)W" from Shell Chemical Co.
[3]Composition also included 15 grams of "EPI-CURE ®" 3253 catalyst (dimethylaminomethylphenol) from Shell Chemical Co.
[4]"Vestamine ® IPD" from Hulls of America, Inc.
[5]Average of three cylinders cured at temperature for 72 hrs.
[6]Average of three cubes cured at temperature for 72 hrs.

From the Table, it can be seen that the epoxy sealant compositions have excellent properties for sealing conduits in lateral well bores.

EXAMPLE 2

An epoxy sealant composition was prepared comprised of 600 grams of diglycidyl ether of cyclohexane dimethanol ("HELOXY® 107" from Shell Chemical Company), 600 grams of microsand and 140 grams of diethyltoluenediamine ("EPI-CURE®(R)W" from Shell Chemical Company). The epoxy sealant composition was allowed to harden in a cylinder for 24 hours at 250° F. The weight of the resulting hardened cylindrical composition was determined to be 272.36 grams. The cured composition was then submerged in crude oil in an autoclave at 250° F. for 72 hours. At the end of the 72 hours, the composition was rinsed with acetone and it was again weighed. The weight was determined to be 272.68 grams. Thus, the hardened epoxy sealant composition was not dissolved or otherwise weakened by prolonged contact with hot crude oil as would be the case when the epoxy resin was used to seal a conduit in a lateral well bore penetrating a deep crude oil reservoir.

Thus, the present invention is well adapted to carry out the objects and attain the features and advantages mentioned as well as those which are inherent therein. While numerous changes may be made by those skilled in the art, such changes are encompassed within the spirit of this invention as defined by the appended claims.

What is claimed is:

1. A method of bonding and sealing a conduit in a lateral well bore whereby the sealant can withstand stress induced conduit movements without failure comprising the steps of:
   (a) preparing a hardenable epoxy sealant composition having a viscosity at 25° C. in the range of from about 10 to about 100 centipoises and having high degrees of flexibility and resiliency upon hardening comprising an epoxide containing liquid and a hardening agent;
   (b) placing said epoxy composition into said well bore between said conduit and the walls of said well bore; and
   (c) allowing said epoxy composition to harden in said well bore.

2. The method of claim 1 wherein said epoxide containing liquid is selected from the group of diglycidyl ethers of 1,4-butanediol, neopentyl glycol and cyclohexane dimethanol.

3. The method of claim 1 wherein said hardening agent is selected from the group of aliphatic amines and anhydrides.

4. The method of claim 1 wherein said hardening agent is selected from the group of triethylenetetramine, ethylenediamine, N-cocoalkyltrimethylenediamine, isophoronediamine and diethyltoluenediamine, and is present in said composition in an amount in the range of from about 15% to about 31% by weight of said epoxide containing liquid in said composition.

5. The method of claim 1 wherein said hardening agent is isophoronediamine present in said composition in an amount of about 25% by weight of said epoxide containing liquid in said composition.

6. The method of claim 1 wherein said epoxy composition further comprises a filler selected from the group consisting of crystalline silicas, amorphous silicas, clays, calcium carbonate and barite.

7. A method of bonding and sealing a conduit in a lateral subterranean well bore connected to a principal well bore whereby the sealant can withstand stress induced conduit movement without failure comprising the steps of:
   (a) preparing a hardenable epoxy resin sealant composition having a viscosity at 25° C. in the range of from about 90 to about 120 centipoises and having high degrees of flexibility and resiliency upon hardening comprising an epoxy resin selected from condensation products of epichlorohydrin and bisphenol A, an epoxide containing liquid and a hardening agent;
   (b) pumping said epoxy resin composition into said lateral well bore between said conduit therein and the walls of said lateral well bore; and
   (c) allowing said epoxy resin composition to harden in said lateral well bore.

8. The method of claim 7 wherein said epoxy resin has a molecular weight of about 340 and a one gram equivalent of epoxide per about 180 to about 195 grams of resin.

9. The method of claim 7 which further comprises dispersing said hardenable epoxy resin composition in an aqueous carrier liquid.

10. The method of claim 7 wherein said epoxide containing liquid is selected from the group of diglycidyl ethers of 1,4-butanediol, neopentyl glycol and cyclohexane dimethanol and is present in said composition in an amount in the range of from about 15% to about 40% by weight of said epoxy resin in said composition.

11. The method of claim 7 wherein said epoxide containing liquid has a molecular weight in the range of from about 200 to about 260 and a one gram equivalent of epoxide per about 120 to about 165 grams of said epoxide containing liquid.

12. The method of claim 7 wherein said hardening agent is selected from the group of triethylenetetramine, ethylenediamine, N-cocoalkyltrimethylenediamine, isophoronediamine and diethyltoluenediamine.

13. The method of claim 7 wherein said hardening agent is present in said composition in an amount in the range of from about 5% to about 45% by weight of said composition.

14. The method of claim 7 wherein said epoxide containing liquid is selected from the group of diglycidyl ethers of 1,4-butanediol, neopentyl glycol and cyclohexane dimethanol and is present in said composition in an amount of about 25% by weight of said epoxy resin in said composition.

15. The method of claim 7 wherein said hardening agent is isophoronediamine and is present in said composition in an amount of about 30% by weight of said composition.

16. The method of claim 7 wherein said epoxy resin composition further comprises a filler selected from the group consisting of crystalline silicas, amorphous silicas, clays, calcium carbonate and barite.

17. The method of claim 16 wherein said filler is present in said composition in an amount in the range of from about 100% to about 150% by weight of said composition.

18. A method of bonding and sealing a conduit in a lateral subterranean well bore connected to a principal well bore whereby the sealant can withstand stress induced conduit movement without failure comprising the steps of:
   (a) preparing a hardenable epoxy resin sealant composition having a viscosity at 25° C. in the range of from about 90 to about 120 centipoises and having high degrees of flexibility and resiliency upon hardening comprising an epoxy resin selected from condensation products of epichlorohydrin and bisphenol A, an epoxide containing liquid selected from the group of diglycidyl ethers of 1,4-butanediol, neopentyl glycol and cyclohexane dimethanol present in said composition in an amount in the range of from about 15% to about 40% by weight of said epoxy resin in said composition and a hardening agent selected from the group of triethylenetetramine, ethylenediamine, N-cocoalkyltrimethylenediamine, isophoronediamine and diethyltoluenediamine present in said composition in an amount in the range of from about 5% to about 45% by weight of said composition;

(b) pumping said epoxy resin composition into said lateral well bore between said conduit therein and the walls of said lateral well bore; and (c) allowing said epoxy resin composition to harden in said lateral well bore.

19. The method of claim 18 which further comprises dispersing said hardenable epoxy resin composition in an aqueous carrier liquid.

20. The method of claim 19 wherein said epoxy resin composition further comprises a filler selected from the group consisting of crystalline silicas, amorphous silicas, clays, calcium carbonate and barite.

* * * * *